Jan. 8, 1963 R. C. WEBSTER 3,072,487
PROPELLENT FOR PRESSURIZED FOOD
Filed April 8, 1960
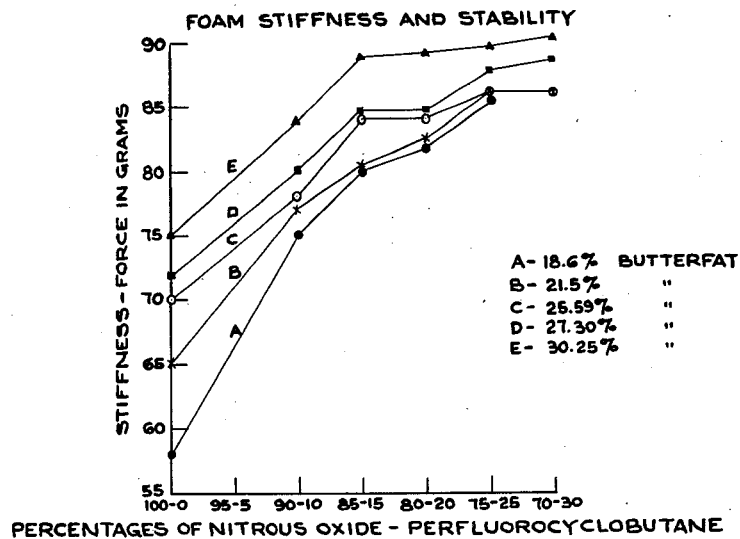
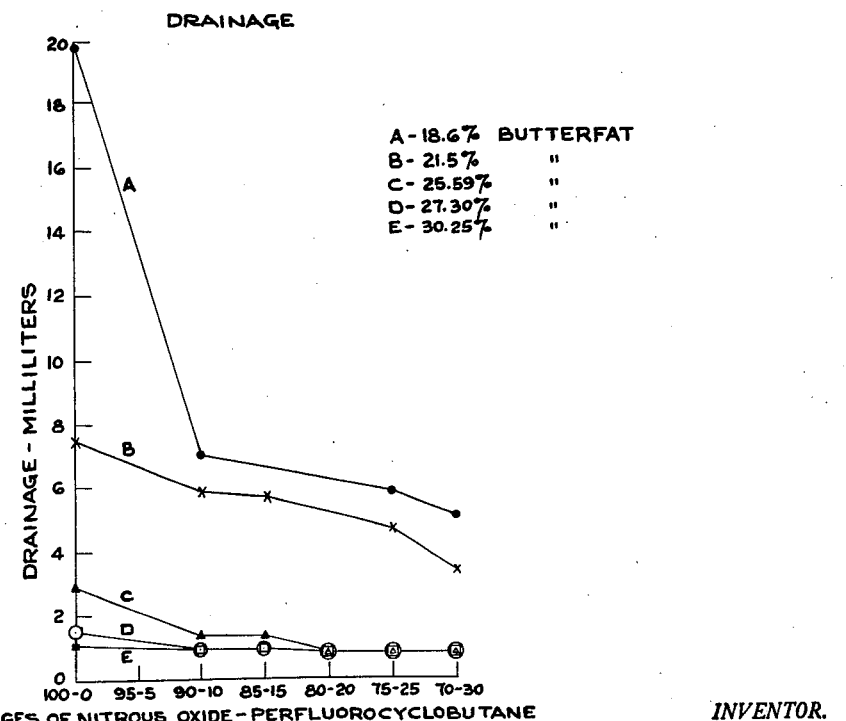
INVENTOR.
ROBERT C. WEBSTER
BY
AGENT

United States Patent Office 3,072,487
Patented Jan. 8, 1963

3,072,487
PROPELLENT FOR PRESSURIZED FOOD
Robert C. Webster, Madison, Wis., assignor to Air Reduction Company, Incorporated, New York, N.Y., a corporation of New York
Filed Apr. 8, 1960, Ser. No. 20,889
1 Claim. (Cl. 99—60)

The invention relates to improvements in propellents for dispensing fat-based food formulations, more particularly cream formulations, in whipped or aerated form from pressurized dispensing containers.

It is recognized that the amount of butter fat content is indicative of the qualtity characteristics of whipping cream formulations contained in pressurized or aerosol type dispensing containers; the greater the butter fat content, the better the quality of the product. Correlatively, the higher the butter fat content, the more costly the cream product. The characteristics generally considered in evaluating the quality of whipped cream dispensed from a pressurized container are its stiffness and stability, over-run, drainage and appearance, or shape and color.

A primary object of the invention is to provide a propellent for whipping cream formulations which imparts improved quality characteristics to the dispensed whipped product, quality characteristics heretofore associated with cream formulations having a higher butter fat content.

Another object of the invention is to provide a propellent which is economical; the savings obtained by the improved quality of the relatively low butter fat content of the whipped cream is substantially greater than the slight increase in cost of the propellent affording the improved quality of the product.

A further and more general object of the invention is to provide a propellent for dispensing fat-based food formulations from pressurized dispensing containers wherein the propellent imparts improved quality characteristics to the whipped food product for the fat content thereof.

Correlative objects of the invention are to provide whipping cream or fat-based formulations in combination with a propellent to afford the foregoing advantages, coupled with whipping cream-propellent mixtures which are clinically safe, and which possess adequate equilibrium pressures for suitably dispensing the food product from a container.

These, and other objects and advantages of the invention will be apparent from the following description of several preferred embodiments of the invention.

The propellent in accordance with the invention comprises a mixture of nitrous oxide and perfluorocyclobutane in the approximate amounts, by weight, of 70 to 95% nitrous oxide and 5 to 30% perfluorocyclobutane. Preferably, the propellent mixture comprises 70 to 85% nitrous oxide and 15 to 30% perfluorocyclobutane.

Nitrous oxide, or mixtures of nitrous oxide and carbon dioxide, are clinically acceptable propellents in wide commercial use for dispensing and whipping food formulations from pressurized dispensing containers. These propellents, which are comparatively inexpensive, are described in the patents to Reinecke, 2,120,297, and Getz, 2,294,172 and 2,435,682.

Perfluorocyclobutane, as a propellent for food formulations, is described in the patent to Young, 2,849,323. Perfluorocyclobutane, or more specifically octafluorocyclobutane, which has the formula

is tasteless, odorless, chemically stable, and nontoxic. However, perfluorocyclobutane is a liquefied, compressed gas, which has a vapor pressure of only 25 p.s.i.g. at 70° F. As explained in the aforementioned Young patent, such low vapor pressure, particularly at the temperature of storing in a refrigerator, approximately 40° F., requires the mixture of an auxiliary propellent with the perfluorocyclobutane in order to provide adequate pressure in the container. It has been proposed to mix from 1 to 10% of chlorotrifluoromethane, tetrafluoromethane, or chloropentafluoroethane with 90 to 99% of the perfluorocyclobutane. Although these auxiliary propellents or boosters would be used in minor amounts, their suitability for ingestion has not been fully determined, nor is their effect upon the physical nature or appearance and quality of propellent products, especially whipped cream, known. Then, too, the major and substantial amount of perfluorocyclobutane in such mixture presents an unduly high cost factor for existing market conditions; perfluorocyclobutane is quite expensive.

The nitrous oxide and perfluorocyclobutane mixtures may be prepared and charged into dispensers for the purposes of the present invention in any suitable manner such as will be readily apparent to those skilled in the art. Thus, for example, desired amounts of each of the constituents may be metered from respective sources thereof and introduced in the desired relative amounts into the dispensing containers. Alternatively, inasmuch as it has been found that nitrous oxide and perfluorocyclobutane form a homogeneous liquid phase under sufficient pressure, such a liquid mixture of the desired proportions may be formed and, after vaporization, charged into the aerosol dispensers through a reducing valve. In charging the containers a conventional gasser-shaker may be used. The dispensers are charged with a propellent mixture in a conventional manner, valves being applied with a crimper, which partly removes the air from the head space. The equilibrium pressure of the described gas mixture in a suitable quantity for dispensing a whipped cream formulation may range between the commercially acceptable pressure values of 82 to 100 p.s.i.g. at 40° F.

It has been determined that a nitrous oxide and perfluorocyclobutane mixture in the proportions indicated, when confined in a dispensing container with a whipping cream formulation, furnishes a whipped cream which possesses the stiffness and stability, drainage, over-run and appearance characteristics heretofore associated with whipped cream formulations having a substantially higher butter fat content. The equilibrium pressure supplied by the nitrous oxide-perfluofocyclobutane mixture is sufficiently high to suitably dispense the whipping cream after storage at the usual temperatures of refrigeration. The propellent mixture is nontoxic, tasteless, odorless, colorless, and chemically stable.

The improved, unexpected and surprising results afforded by the invention will be apparent by comparing the characteristics of foam stiffness and stability, drainage, over-run and appearance provided by whipping cream formulations differing from one another essentially in their respective butter fat contents, when the formulations are dispensed and whipped respectively by mixtures of nitrous oxide and perfluorocyclobutane in accordance with the invention and by the commonly known propellent, nitrous oxide. The cream formulations tested, which are of the usual variety, were of the following compositions:

FORMULA A

*Ingredients—Lbs.*

| | |
|---|---|
| Cream (30.85% fat) | 18.80 |
| Condensed skim (32.8% total solids) | 2.70 |
| Skim milk (8.8% total solids) | 4.95 |
| Corn sugar | 0.725 |
| Cane sugar | 1.74 |
| Stabilizer | .087 |

3

*Analysis—Percent*

| | |
|---|---|
| Fat | 18.65 |
| Serum solids | 10.05 |
| Corn sugar | 2.50 |
| Cane sugar | 6.0 |
| Stabilizer | 0.3 |
| Total solids | 37.50 |

FORMULA B

*Ingredients—Lbs.*

| | |
|---|---|
| Cream (30.85% fat) | 21.20 |
| Skim milk (8.8% total solids) | 2.64 |
| Condensed skim (32.8% total solids) | 2.66 |
| Corn sugar | 0.58 |
| Cane sugar | 1.89 |
| Stabilizer | .087 |

*Analysis—Percent*

| | |
|---|---|
| Fat | 21.50 |
| Serum solids | 9.37 |
| Cane sugar | 6.50 |
| Corn sugar | 2.00 |
| Stabilizer | .30 |
| Total solids | 39.67 |

FORMULA C

*Ingredients—Lbs.*

| | |
|---|---|
| Cream (40.43% fat) | 17.4 |
| Condensed skim (33.8% total solids) | 2.44 |
| Skim milk (8.8% total solids) | 5.74 |
| Corn sugar | 0.42 |
| Cane sugar | 1.96 |
| Stabilizer | .084 |

*Analysis—Percent*

| | |
|---|---|
| Fat | 25.59 |
| Serum solids | 7.49 |
| Corn sugar | 1.50 |
| Cane sugar | 7.00 |
| Stabilizer | 0.3 |
| Total solids | 41.88 |

FORMULA D

*Ingredients—Lbs.*

| | |
|---|---|
| Cream (40.43% fat) | 18.74 |
| Condensed skim (33.8% total solids) | 2.33 |
| Skim milk (8.8% total solids) | 4.55 |
| Corn sugar | 0.28 |
| Cane sugar | 2.03 |
| Stabilizer | .076 |

*Analysis—Percent*

| | |
|---|---|
| Fat | 27.30 |
| Serum solids | 7.69 |
| Corn sugar | 1.00 |
| Cane sugar | 7.25 |
| Stabilizer | .27 |
| Total solids | 43.51 |

FORMULA E

*Ingredients—Lbs.*

| | |
|---|---|
| Cream (40.43% fat) | 20.82 |
| Condensed skim (33.8% total solids) | 2.27 |
| Skim milk (8.8% total solids) | 2.72 |
| Cane sugar | 2.10 |
| Stabilizer | .07 |

4

*Analysis—Percent*

| | |
|---|---|
| Fat | 30.25 |
| Serum solids | 7.59 |
| Cane sugar | 7.50 |
| Stabilizer | .25 |
| Total solids | 45.59 |

To compare the quality characteristics provided by the foregoing formulations, 211 x 413 aerosol containers, having a nominal capacity of 12 ozs., were each filled with 7 fluid ozs. of the respective cream formulations and charged with (a) 100% nitrous oxide and (b) mixtures of nitrous oxide and perfluorocyclobutane in the following proportions by percentage weight:

| Nitrous Oxide | Perfluorocyclobutane |
|---|---|
| 90 | 10 |
| 85 | 15 |
| 80 | 20 |
| 75 | 25 |
| 70 | 30 |

The amount of the propellent mixture in each container was approximately six (6) grams, and the pressure averaged between approximately 91 and 102 p.s.i.g. The desired amount of propellent generally will be the minimum needed to maintain an adequate container pressure during discharge of the entire contents.

A curd tension meter was used to measure foam stiffness. This measuring instrument determines the force in grams on a disk 1.5 inches in diameter, which is supported by the whipped cream. The results of the foam stiffness tests, immediately following dispensing, are shown in FIG. 1.

Referring to FIG. 1, it will be observed that a propellent mixture of 90% nitrous oxide and 10% perfluorocyclobutane imparts a foam stiffness value of 75 grams to a cream formulation having a butter fat content as low as 18% (Formula A). Such comparatively high measure of foam stiffness for this low butter fat content formulation is equal to the foam stiffness provided by the formulation having a butter fat content of approximately 30% (Formula E) when dispensed with nitrous oxide alone. With a propellent mixture of 85% nitrous oxide and 15% perfluorocyclobutane, the low or approximately 18% butter fat content formulation, provides better foam stiffness than obtained with the approximately 30% butter fat content formulation when using nitrous oxide alone as the propellent; 80 as compared to 75 grams. Propellent mixtures in which the perfluorocyclobutane content is increased to 20 to 25%, furnish higher values of foam stiffness. It will be apparent that mixture with nitrous oxide of the relatively small amounts of perfluorocyclobutane, up to 30% of perfluorocyclobutane, appreciably improves the foam stiffness for all of the formulations.

Drainage or serum loss was measured by placing a weighed portion of the whipped cream in a funnel over a one-half-inch disk of 16-mesh wire screen. The samples were stored for one hour at 70° F. and the drainage was recorded in millimeters per 100 grams of product. The results of the drainage tests are shown in FIG. 2.

As may be expected, and apart from the particular propellents used, drainage or weeping is decreased with an increase in the butter fat content of the whipped cream. It will be observed, however, that the mixture of small amounts of perfluorocyclobutane with nitrous oxide results in less weeping or drainage of the whipped cream than when nitrous oxide alone is used. This is most evident with the formulations of low butter fat content. A mixture of only 10% perfluorocyclobutane with nitrous oxide provides considerably less drainage for the 18.6% butter fat content formulation than when the same formulation is dispensed with nitrous oxide, per se. In fact, such propellent mixture furnishes better drainage characteristics than the higher butter fat formulation B dispensed with 100% nitrous oxide.

Over-run is a measure of the degree of expansion of the dispensed whipped cream in percent, and represents the dispensed volume minus the original volume divided by the original volume times 100. The results of the over-run tests are indicated in the table below:

TABLE I

| Weight Percent (a) Perfluorocyclobutane; (b) Nitrous Oxide | | Formula, Percent | | | | |
| --- | --- | --- | --- | --- | --- | --- |
| (a) | (b) | A | B | C | D | E |
| 0 | 100 | 193 | 228 | 228 | 218 | 272 |
| 10 | 90 | 207 | 235 | 228 | 228 | 257 |
| 15 | 85 | 243 | 228 | 257 | 235 | 286 |
| 20 | 80 | 243 | 228 | 257 | 221 | 235 |
| 25 | 75 | 207 | 214 | 250 | 243 | 270 |
| 30 | 70 | 228 | 214 | 221 | 228 | 257 |

Except for slight variations due to variations due to variations of container pressure, the propellent mixtures with nitrous oxide of designated small amounts of perfluorocyclobutane provide increased expansion or over-run, as compared to the use of nitrous oxide alone as the propellent for the respective formulas differing from one another essentially in butter fat content. It will be observed that with a propellent mixture of 15% perfluorocyclobutane and 85% nitrous oxide, Formula A having a butter fat content of approximately 18%, furnishes a better over-run value than Formulas B, C, and D having respective butter fat contents of 21%, 25.6%, and 27.3% when such higher butter fat content formulations are dispensed with a propellent of nitrous oxide alone.

The better appearance from the standpoint of shape and color, and improved drainage, obtained with use of a propellent mixture comprising 15% perfluorocyclobutane and 85% nitrous oxide as compared to nitrous oxide alone, will be apparent from the data set forth in Table II below. Formulas B and E, differing from one another in approximately 10% butter fat content, were evaluated. The samples' shape were evaluated in terms of peak and flute retention. The evaluations were recorded after storage of the samples at 70° F.

indicated are much more stable than cream formulations dispensed with nitrous oxide. Although the test values for foam stiffness, over-run, drainage and appearance characteristics reflect the comparison of the nitrous oxide and perfluorocyclobutane mixtures of the invention with respect to nitrous oxide, per se, mixtures of nitrous oxide and carbon dioxide furnish essentially the same results as 100% nitrous oxide, and the improved characteristics provided by the perfluorocyclobutane and nitrous oxide mixtures of the invention are equally observable with respect to cream formulations which are dispensed and whipped by propellent mixtures of nitrous oxide and carbon dioxide. The propellent mixtures of the invention permit whipped cream desserts to be prepared an hour or more before serving; a whipped cream can even be served on a hot dessert, maintaining a much more attractive appearance than furnished by conventional aerosol whipped cream formulations.

The results of the tests indicate that the nitrous oxide and perfluorocyclobutane propellent mixtures of the invention impart to a low butter fat content whipping cream formulation the quality characteristics normally associated with formulations having a substantially higher butter fat content dispensed with conventional propellents. The increased cost resulting from the relatively small amount of expensive perfluorocyclobutane used in mixture with the nitrous oxide is more than offset by the substantial improvements in quality characteristics imparted to whipping cream formulations of low butter fat content.

The range of perfluorocyclobutane in mixture with the nitrous oxide, is related to the butter fat range; the lower the butter fat content, the greater the proportion of perfluorocyclobutane preferred in mixture with the nitrous oxide. Thus, with a whipped cream having a butter fat content as low as approximately 18%, a mixture comprising 25 to 30% perfluorocyclobutane and 75 to 70% nitrous oxide is preferred. With an increase in butter fat content, the amount of perfluorocyclobutane in the mixture may be reduced and the amount of nitrous oxide increased, within the indicated ranges of these ingredients.

While the propellent mixture of the invention has been specifically described with relation to whipping cream formulations, and it is in this respect the advantages and improved results of the invention are most clearly evident, it is within the scope of the invention to use the described propellent mixture for dispensing and whipping other fat-based food formulations, such as ice cream mixes, custards, cake frostings, etc.

It will be apparent that while the invention has been

TABLE II

[Whipped cream visual evaluation]

| Formula | Time, Min. | Percent Perfluorocyclobutane; the remainder—Nitrous Oxide | Appearance | | | |
| --- | --- | --- | --- | --- | --- | --- |
| | | | Shape | Percent | Color | Drainage |
| B | 5 | 0 | Soft edges | 90 | Good | None. |
| B | 5 | 15 | Sharp edges | 100 | Excellent | None. |
| E | 5 | 0 | Soft edges | 70 | Slightly yellow | Slight. |
| E | 5 | 15 | Slightly soft | 90 | Good | None. |
| B | 30 | 0 | Edges lost | 50 | Slightly yellow | Slight. |
| B | 30 | 15 | Sharp edges | 90 | Excellent | None. |
| E | 30 | 0 | Collapsed | 30 | Slightly yellow | Moderate. |
| E | 30 | 15 | Slightly soft | 75 | Good | Slight. |
| B | 60 | 0 | Poor | 35 | Yellow | Bad. |
| B | 60 | 15 | Sharp edges | 70 | Good | None. |
| E | 60 | 0 | Collapsed | 20 | Dark Yellow | Bad. |
| E | 60 | 15 | Fair | 60 | Good | Moderate. |
| B | 24 hrs | 0 | Collapsed | 10 | Dark Yellow | Bad. |
| B | 24 hrs | 15 | Dull edges | 60 | Good | Slight. |
| E | 24 hrs | 0 | Collapsed | 10 | Dark Yellow | Bad. |
| E | 24 hrs | 15 | Very soft | 50 | Slightly yellow | Bad. |

The foregoing test results show that whipping cream formulations dispensed with a propellent comprising nitrous oxide and perfluorocyclobutane in the proportions described in a preferred form, changes may be made without departing from the spirit and scope of the invention as sought to be defined in the following claim.

I claim:

A propellent for dispensing a cream formulation having a butter fat content of not more than 30% and at least about 18% in whipped form from a pressurized dispensing container, said propellent comprising a mixture of approximately 70 to 95% nitrous oxide and approximately 5 to 30% perfluorocyclobutane, by weight, said perfluorocyclobutane range being related to said butter fat range, whereby the lower the butter fat content the greater the amount of perfluorocyclobutane present in the propellent mixture.

References Cited in the file of this patent

UNITED STATES PATENTS

| | | |
|---|---|---|
| 2,435,682 | Getz | Feb. 1, 1948 |
| 2,849,323 | Young | Aug. 26, 1958 |
| 2,952,547 | Hill | Sept. 13, 1960 |